United States Patent [19]

Orfan et al.

[11] Patent Number: 5,132,121
[45] Date of Patent: Jul. 21, 1992

[54] GUM BASE CONTAINING TOCOPHEROL

[75] Inventors: Charles P. Orfan, Howell; Daniel A. Vento, Edison; Archie L. Hightower, Plainfield; Walter C. Romanofsky, Piscataway, all of N.J.

[73] Assignee: Wm. Wrigley Jr. Company, Chicago, Ill.

[21] Appl. No.: 743,824

[22] Filed: Aug. 12, 1991

[51] Int. Cl.$^5$ .............................................. A23G 3/30
[52] U.S. Cl. ......................................... 426/3; 426/72; 426/541
[58] Field of Search .................................. 426/3-6, 426/72, 541

[56] References Cited

U.S. PATENT DOCUMENTS

| | | | |
|---|---|---|---|
| 4,001,438 | 6/1977 | Marmo et al. | 426/96 |
| 4,101,559 | 7/1978 | McFadden et al. | 260/347.3 |
| 4,107,177 | 8/1978 | McFadden et al. | 260/332.3 |
| 4,107,321 | 8/1978 | McFadden et al. | 424/274 |
| 4,489,099 | 12/1984 | Shaheen et al. | 426/3 |
| 4,504,499 | 3/1985 | Finnan | 426/250 |
| 4,714,612 | 12/1987 | Nakamura et al. | 424/85 |
| 4,765,927 | 8/1988 | Nomura et al. | 253/400.2 |
| 4,948,595 | 8/1990 | Patel et al. | 426/3 |
| 4,977,282 | 12/1990 | Baldwin et al. | 549/112 |
| 5,009,891 | 4/1991 | Niwa et al. | 424/195.100 |

FOREIGN PATENT DOCUMENTS 0079746 7/1976 Japan .................... 426/541

OTHER PUBLICATIONS

Article. "Food Processing 1989 Awards", Food Processing Magazine, Jul. 1989.
Akzo Technical Bulletin, Akzo Salt, Inc., TB 1570, Sep. 1989.
Akzo Product Information brochure, Akzo Salt, Inc., PI 1590, Oct. 1987.
Akzo Product Information brochure, Akzo Salt, Inc., PI 1580, Oct. 1987.
Akzo Product Information brochure, Akzo Salt, Inc., PI 1560, Oct. 1987.
Article, "Antioxidants: Past, Present, Future", Food Processing Magazine, May 1990.
Article, "Natural Tocopherols Provide Antioxidant Protection to Meats", Food Processing Magazine, Apr. 1988.
Brochure, "Eastman Tenox GT-1 and Tenox Gt-2", Eastman Kodak Co., May 1991.

Primary Examiner—Jeanette Hunter
Attorney, Agent, or Firm—Willian Brinks Olds Hofer Gilson & Lione

[57] ABSTRACT

A chewing gum base is stablized with a specific mixture of tocopherol homologs, thereby eliminating the need for synthetic antioxidants. The mixture of tocopherol homologs falls within the range of 7-20% by weight alpha tocopherol, 45-75% by weight gamma tocopherol and 18-32% by weight delta tocopherol.

28 Claims, No Drawings

GUM BASE CONTAINING TOCOPHEROL

FIELD OF THE INVENTION

The present invention relates to a chewing gum base material which contains a specific blend of tocopherol homologs which provides improved antioxidant effects.

BACKGROUND OF THE INVENTION

As is known in the art, chewing gum compositions typically comprise a water soluble bulk portion, a water insoluble chewing gum base portion and typically water insoluble flavoring agents. The water soluble portion dissipates with a portion of the flavoring agent over a period of time during chewing. The gum base portion is retained in the mouth throughout the chewing process.

The gum base includes a number of ingredients, some of which are subject to deterioration through oxidation during storage. The insoluble gum base generally comprises elastomers, elastomer plasticizers, waxes, fats, oils, softeners, emulsifiers, fillers, texturizers and miscellaneous ingredients such as antioxidants, preservatives, colorants and whiteners. Ingredients having a double bond between carbon atoms, including fats, oils, some elastomers and elastomer plasticizers, are susceptible to oxidation. The gum base constitutes between 5-95% by weight of the chewing gum composition, more typically 10-50% by weight of the chewing gum, and most commonly 15-25% by weight of the chewing gum.

Commonly used natural or artificial antioxidants/preservatives include beta-carotenes, acidulants (e.g. Vitamin C), propyl gallate, butylated hydroxyanisole (BHA), butylated hydroxytoluene (BHT) and tertiary butyl hydroquinone (TBHQ). The most notable and commonly used of these include synthetic antioxidants BHA, BHT and TBHQ.

Tocopherols are naturally occurring compounds which are known to have antioxidant properties. The most common tocopherol, alpha-tocopherol, is also known as vitamin E. The other common homologs are beta, gamma and delta tocopherols. All of these tocopherol homologs are FDA approved additives which have been shown to be safe in animal testing. Natural tocopherols are usually derived from vegetable oils, especially soybean oil. Tocopherols can also be found in many spices, fruits, nuts, seeds and other plant sources.

Unfortunately, the tocopherol homologs have been found to be generally less effective than BHA and BHT in preventing oxidation of chewing gum base components. Tocopherols also have upper usage level limits, above which oxidation of the gum base ingredients will start to increase again. Tocopherols have been used successfully as stabilizers for some chewing gum ingredients, such as styrene butadiene rubber, when added in combination with certain synthetic stabilizers. U.S. Pat. No. 4,489,099 issued to Shaheen et al. discloses the use of vitamin E tocopherol in combination with dilauryl thiodipropionate (DLTDP). However, it has previously been less effective to use tocopherols in chewing gum base compositions, by themselves.

SUMMARY OF THE INVENTION

It has been discovered that certain mixtures of tocopherol homologs, in certain ratios, exhibit significant improvement in antioxidant properties when used in chewing gum bases. The homologue mixtures useful in the invention are more effective at preventing oxidation of gum base ingredients than any of the constituent homologs used alone and are as effective, or sometimes more effective, than BHT.

It has also been discovered that tocopherols do not volatilize as much as BHT, when used in a chewing gum base which is typically processed at about 80°-150° C. This allows the antioxidant level in the gum base to remain relatively constant, based on the amount that was added initially. Also, tocopherols can be added at levels greater than 0.1% by weight, facilitating even better antioxidant results. Food and Drug Administration regulations limit BHT concentrations to 0.1% by weight, and BHT is typically used at levels between 0.02 and 0.09% by weight.

The tocopherol mixtures useful in the present invention will contain at least three tocopherol homologs, alpha, gamma and delta, in specific ratios. Beta tocopherol and possibly other homologs may also be present in small quantities.

Expressed as percentage ranges of active ingredients (i.e. weight percentages based on total tocopherols) the ranges are 7-20% alpha tocopherol, 45-75% gamma tocopherol and 18-32% delta tocopherol. The preferred ranges are 12-17% alpha tocopherol, 60-68% gamma tocopherol and 22-28% delta tocopherol. The most preferred ranges are 12-15% alpha tocopherol, 63-65% gamma tocopherol and 23-26% delta tocopherol. Up to 3% beta tocopherol may optionally be present.

The tocopherol mixtures used in the present invention may be naturally occurring products, mixtures of naturally occurring products, modifications of natural products, mixtures of component tocopherols or natural products with added component tocopherols. Normally, the tocopherol mixture will be present in a diluent, most commonly a vegetable oil. The amount of the diluent is not important from an antioxidant standpoint. However, active levels of about 70% (reflecting about 70% by weight tocopherol and about 30% by weight diluent) are preferred for viscosity and handling reasons.

With the foregoing in mind, it is a feature and advantage of the invention to provide a stabilizer system for chewing gum bases which minimizes the oxidation of the gum base ingredients without the use of synthetic antioxidants such as BHA and BHT.

It is also a feature and advantage of the invention to provide gum base compositions for use in chewing gum, which are shelf stable and which do not contain synthetic antioxidants.

It is also a feature and advantage of the invention to provide chewing gum compositions, which are stable and which avoid the use of synthetic BHA and BHT antioxidants.

These and other features and advantages of the invention will become apparent from the following description which, when read in conjunction with the accompanying examples, discloses presently preferred exemplary embodiments of the present invention. It should be understood that this description is illustrative rather than limiting, the scope of the invention being defined by the appended claims and equivalents thereof.

DETAILED DESCRIPTION OF THE PRESENTLY PREFERRED EMBODIMENTS

Oxidation of gum base ingredients causes undesirable changes in the color, odor, texture and taste of the chewing gum. It has always been a major objective of chewing gum manufacturers to maintain the quality and prolong the shelf life of chewing gum. Therefore, the oxidation of chewing gum ingredients, including gum base ingredients, is a central concern of chewing gum manufacturers.

Previously synthetic antioxidants BHA, BHT and TBHQ have been primarily used for stabilizing chewing gum bases. The common feature that renders these compounds effective as antioxidants is their phenolic-based structure, as shown below:

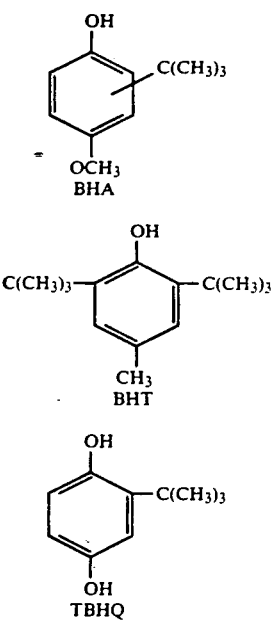

Tocopherols are natural substances found in vegetable and other plant seeds such as soybeans, sunflower seeds, and various fruits and nuts. The fact that tocopherols are naturally derived makes them more attractive to chewing gum manufacturers and consumers, than synthetic antioxidants. From an antioxidant standpoint, tocopherols are of interest because they contain phenolic-type groups similar to those found in BHA, BHT and TBHQ:

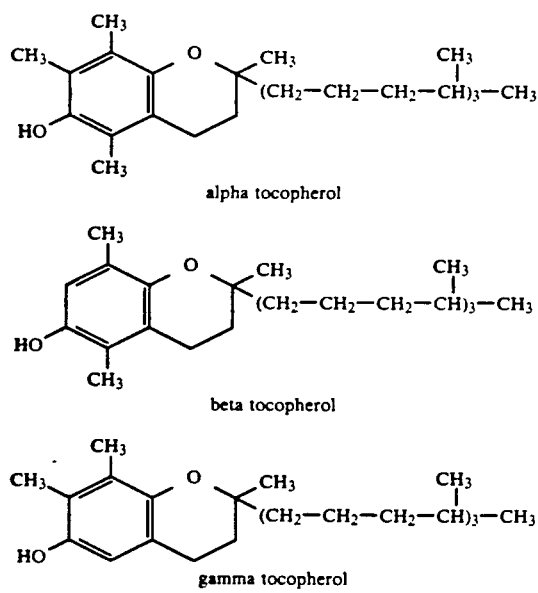

-continued

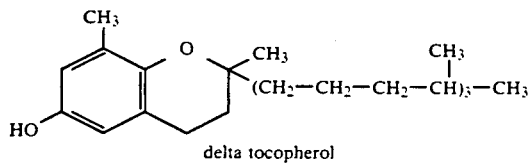

delta tocopherol

When used individually, the different tocopherol homologs are known to exhibit different levels of chemical activity, including different levels of antioxidant activity. For this reason, processes have been developed for isolating the individual homologs from mixtures, and for converting tocopherols from one homologue to another. Such processes are discussed in U.S. Pat. No. 4,977,282 issued to Baldwin et al.

Prior to the current invention, however, it was not known that specific blends of tocopherol homologs exhibit levels of antioxidant activity in gum base which are higher than each of the homologs taken individually, and which are comparable to BHT. As previously stated, the present invention relates to the use of tocopherol mixtures in chewing gum bases which effect improved antioxidant activity in chewing gum bases, and whose antioxidant activity is similar to or better than that which is found when typical levels of BHT are used.

The preferred amount of the tocopherol mixture may vary depending upon the specific chewing gum base composition. The preferred amount may also vary depending on the specific composition of the chewing gum in which the gum base is used, because some of the antioxidant can migrate into the other chewing gum components. The following Table 1 describes both the preferred composition of the tocopherol mixture useful in the invention, and the preferred amount which is to be added into chewing gum base compositions:

TABLE 1

| | Tocopherol Composition And Amounts Used | |
|---|---|---|
| | (A) Tocopherol Composition (% by weight, based on total tocopherols) | (B) Amounts Used (% by weight added to chewing gum base) |
| Range | 7-20% alpha tocopherol 45-75% gamma tocopherol 18-32% delta tocopherol | .01-1.00% |
| Preferred Range | 12-17% alpha tocopherol 60-68% gamma tocopherol 22-28% delta tocopherol | .05-.50% |
| Most Preferred Range | 12-15% alpha tocopherol 63-65% gamma tocopherol 23-26% delta tocopherol | .08-.20% |

It should be noted that many gum base ingredients, including fats, hydrogenated vegetable oils and lecithin, contain small amounts of naturally occurring tocopherols in the range of between about 0.01-0.15% by weight of the ingredient. The percentages listed in Table 1, column B, refer to the amount of tocopherol which should be added to the gum base, over and above any tocopherol which is naturally present. The tocopherol mixture may be added to the gum base by direct addition during manufacture of the gum base. The tocopherols may alternatively be placed in a solvent to yield an emulsion, suspension or solution which is then mixed with the gum base. Edible fats and oils are the preferred solvents. Alternatively, the tocopherols (or emulsions, solutions, dry powders or suspensions thereof) may be preblended with one or more gum base ingredients.

The insoluble gum base generally constitutes between about 5 to about 95 percent by weight of the gum. More preferably the insoluble gum base comprises between 10 and 50 percent by weight of the gum and most preferably about 20 to about 35 percent by weight of the gum. The present invention contemplates employing any commercially acceptable gum base.

Elastomers constitute about 5 to about 95 percent by weight of the base, preferably between 10 and 70 per cent by weight and most preferably between 15 and 45 percent by weight. Elastomers may include synthetic elastomers such as polyisobutylene, isobutylene-isoprene copolymer, styrene-butadiene copolymer, polyvinylacetate, vinyl acetate-vinyl laurate copolymer or mixtures thereof. Natural elastomers may also include natural rubber such as smoked or liquid latex and guayule as well as natural gums such as jelutong, lechi caspi, perillo, massaranduba balata, massaranduba chocolate, nispero, rosindinha, chicle, gutta hang kang or mixtures thereof.

Elastomer plasticizers constitute from about 0 to about 75 percent by weight of the gum base, preferably 5 to 45 per cent by weight and most preferably 10 to 30 per cent by weight. Elastomer plasticizers include natural rosin esters such as glycerol ester of partially hydrogenated rosin, glycerol ester of polymerized rosin, glycerol ester of partially dimerized rosin, glycerol ester of rosin, pentaerythritol esters of partially hydrogenated rosin, methyl and partially hydrogenated methyl esters of rosin, pentaerythritol ester of rosin or mixtures. Elastomer plasticizers also include synthetics such as terpene resins derived from alpha-pinene, beta-pinene and/or d-limonene.

Waxes include synthetic (e.g. polyethylene and Fischer-Tropsch waxes) and natural (candelilla carnauba, beeswax, rice bran or mixtures thereof) and petroleum (e.g. microcrystalline and paraffin). Waxes, when used, generally constitute up to 30 weight percent of the gum base.

Softeners/emulsifiers include tallow, hydrogenated tallow, hydrogenated and partially hydrogenated vegetable oils, cocoa butter, glycerol monostearate, glycerol triacetate, lecithin, mono., di- and triglycerides, acetylated glycerides and fatty acids (e.g. stearic, palmitic, oleic, linoleic and linolenic acids) or mixtures thereof. Softeners/emulsifiers generally constitute between 0.5 and 40 weight per cent of the gum base.

Fillers/texturizers include magnesium and calcium carbonate, ground limestone and silicate types such as magnesium and aluminum silicate, clay, alumina, talc as well as titanium oxide, mono., di- and tricalcium phosphate, cellulose polymers such as ethyl, methyl and wood or mixtures thereof. Preferably, the filler comprises about 1 to about 65 percent by weight of the gum base.

Colorants and whiteners include FD&C-type dyes and lakes, fruit and vegetable extracts, titanium dioxide or mixtures thereof.

The gum base is typically prepared by adding an amount of the elastomer, elastomer plasticizers and filler to a heated sigma blade mixer with a front to rear blade speed ratio of typically 2:1. The initial amounts of ingredients are determined by the working capacity of the mixing kettle in order to attain a proper consistency. After the initial ingredients have massed homogeneously, the balance of the elastomer plasticizer, filler, softeners, etc. are added in a sequential manner until a completely homogeneous molten mass is attained. This can usually be achieved in one to four hours, depending on the formulation. The final mass temperature can be between 60° C. and 150° C., more preferably between 80° C. and 120° C. The completed molten mass is emptied from the mixing kettle into coated or lined pans, extruded or cast into any desirable shape and allowed to cool and solidify.

The water-soluble portion of the chewing gum may comprise softeners, sweeteners, flavoring agents and combinations thereof. Softeners are added to the chewing gum in order to optimize the chewability and mouth feel of the gum. Softeners, also known in the art as plasticizers or plasticizing agents, generally constitute between about 0.5 to about 15.0 percent by weight of the chewing gum. Softeners contemplated by the present invention include glycerin, lecithin, and combinations thereof. Further, aqueous sweetener solutions such as those containing sorbitol, hydrogenated starch hydrolysates, corn syrup and combinations thereof may be used as softeners and binding agents in gum.

Bulk sweeteners constitute between 20-80% by weight of the chewing gum and may include both sugar and sugarless sweeteners and components. Sugar sweeteners may include saccharide containing components including but not limited to sucrose, dextrose, maltose, dextrin, dried invert sugar, fructose, levulose, galactose, corn syrup solids, and the like, alone or in combination. Sugarless sweeteners include components with sweetening characteristics but are devoid of the commonly known sugars. Sugarless sweeteners include but are not limited to sugar alcohols such as sorbitol, mannitol, xylitol, hydrogenated starch hydrolysates, maltitol, and the like, alone or in combination.

High intensity sweeteners may also be present. These may include but are not limited to sucralose, aspartame, salts of acesulfame, alitame, saccharin and its salts, cyclamic acid and its salts, dihydrochalcones, thaumatin, monellin, and the like, alone or in combination.

Combinations of sugar and/or sugarless sweeteners may be used in chewing gum. The sweetener may also function in the chewing gum in whole or in part as a water soluble bulking agent. Additionally, the softener may also provide additional sweetness such as with aqueous sugar or alditol solutions.

One or more flavoring agents may be present in the chewing gum in an amount within the range of about 0.1to about 10.0 percent and preferably from about 0.5 to about 5.0 weight percent of the gum. The flavoring agents may comprise essential oils, natural or synthetic flavors or mixtures thereof including but not limited to oils derived from plants and fruits such as citrus oils, fruit essences, peppermint oil, spearmint oil, other mint oils, clove oil, oil of wintergreen, anise, and the like. Artificial flavoring agents and components are also contemplated. Those skilled in the art will recognize that natural and artificial flavoring agents may be combined in any sensorially acceptable fashion. All such flavors and flavor blends are contemplated by the present invention.

Optional ingredients such as colors, emulsifiers and pharmaceutical agents may be added to the chewing gum.

In general, chewing gum is manufactured by sequentially adding the various chewing gum ingredients to a commercially available mixer known in the art. After the ingredients have been thoroughly mixed, the gum mass is discharged from the mixer and shaped into the desired form such as by rolling into sheets and cutting into sticks, extruding into chunks, or casting into pellets.

Generally, the ingredients are mixed by first softening (e.g. with heat) the gum base and adding it to the running mixer. The base may also be softened in the mixer itself. Color or emulsifiers may also be added at this time. A softener such as glycerin may also be added at this time along with syrup and a portion of the bulking agent. Further portions of the bulking agent portion may then be added to the mixer. A flavoring agent is typically added with the final portion of the bulking agent.

The entire mixing procedure typically takes from five to fifteen minutes, but longer mixing times may sometimes be required. Those skilled in the art will recognize that variations of the above described procedure, or different procedures, may be followed.

A wide range of changes and modifications to the embodiments of the invention described above will be apparent to persons skilled in the art. The following examples are not to be construed as imposing limitations on the invention, but are included merely to illustrate preferred embodiments.

EXAMPLE 1

Tenox GT-2, a commercially available tocopherol blend from Eastman Kodak containing 12.5% alpha tocopherol, 63.9% gamma tocopherol and 23.6% delta tocopherol (based on total tocopherol weight) in a soybean oil diluent (70% tocopherol, 30% soybean oil), was added to a chewing gum base having the following composition:

| Component | % by weight |
| --- | --- |
| Synthetic Elastomers: | |
| Isoprene-Isobutylene | 9.38 |
| Polyisobutylene | 6.31 |
| Polyvinyl Acetate | 24.84 |
| Styrene Butadiene Rubber | 1.54 |
| Natural Elastomer | 21.59 |
| Rosin Esters | 8.13 |
| Microcrystalline Wax | 8.55 |
| Calcium Carbonate | 8.91–9.41 |
| Hydrogenated Vegetable Oils | 7.38 |
| Softeners | 2.87 |

Five different samples were prepared. Four of the samples contained zero, 0.05, 0.10 and 0.50 weight percent of Tenox GT-2, respectively. The fifth sample contained 0.04 weight per cent BHT, which is a typical level. The antioxidants were added to the chewing gum base by direct addition to the gum base mass in the mixer, about thirty minutes before the gum base was removed from the mixer.

The five samples were stored in a reaction vessel at a temperature of 100° F. and a pressure of 100 psi oxygen, for 100 days. The samples were tested for "peroxide value" after zero, 7, 14, 21, 28, 35, 42, 49, 56, 63, 70, 77, 83, 91 and 98 days. Peroxide value is an indication of oxidation, given in meq. peroxide/kg sample. The peroxide value was measured using A.O.C.S. Official Method Cd 8-53, Revised 1986.

The results of this experiment are provided in Table 2 below. At all times and for all antioxidant levels, the peroxide value in the tocopherol-containing samples were almost as low as in the BHT-containing sample. At time periods greater than 70 days, the peroxide values for the 0.10% tocopherol-containing sample and the 0.50% tocopherol-containing sample were lower than for the BHT-containing sample. At time periods of 21 days and longer, the peroxide values in the tocopherol-containing samples were much lower than in the unstabilized sample. This indicates that the Tenox GT-2, containing the tocopherol mixture, exhibits significant antioxidant properties and is as effective or better than BHT.

TABLE 2

| | Performance Of Tocopherol Mixture In Gum Base | | | | | | | | | | | | | | |
| --- | --- | --- | --- | --- | --- | --- | --- | --- | --- | --- | --- | --- | --- | --- | --- |
| | Peroxide Value (meq/kg) (100° F., 100 psi oxygen) | | | | | | | | | | | | | | |
| Antioxidant Type And Level (% based on weight of gum base) | 0 Days | 7 Days | 14 Days | 21 Days | 28 Days | 35 Days | 42 Days | 49 Days | 56 Days | 63 Days | 70 Days | 77 Days | 83 Days | 91 Days | 98 Days |
| 0 | 7.9 | 2.0 | 2.0 | 95.4 | 113 | 141 | 131 | 136 | 108 | 103 | 86 | 90 | 79 | 65 | 62 |
| .05% Tenox GT-2 | 2.0 | 2.0 | 4.0 | 5.8 | 6.0 | 5.9 | 6.0 | 5.9 | 10 | 12 | 22 | 93 | 125 | 75 | 86 |
| .10% Tenox GT-2 | 7.9 | 8.0 | 4.0 | 5.9 | 6.0 | 5.9 | 6.0 | 5.9 | 6.0 | 6.0 | 8.0 | 8.0 | 9.0 | 10 | 12 |
| .50% Tenox GT-2 | 4.0 | 6.0 | 4.0 | 6.0 | 5.9 | 5.9 | 6.0 | 6.0 | 6.0 | 6.0 | 6.0 | 6.0 | 6.0 | 6.0 | 6.0 |
| .04% BHT | 2.0 | 2.0 | 2.0 | 2.0 | 2.0 | 2.0 | 4.0 | 3.9 | 4.0 | 4.0 | 6.0 | 23 | 156 | 123 | 101 |

EXAMPLE 2

The experimental and evaluation procedures of Example 1 were followed except that a different gum base was tested. This chewing gum base had the following composition:

| Component | % by weight |
| --- | --- |
| Synthetic Elastomers: | |
| Isoprene-Isobutylene | 12.12 |
| Polyisobutylene | 9.96 |
| Polyvinyl Acetate | 14.83 |
| Calcium Carbonate | 28.64–29.14 |
| Hydrogenated Vegetable Oils | 28.62 |
| Softeners | 5.33 |

The results of these experiments are shown in Table 3 below. The Tenox GT-2 was as effective as an antioxidant, as BHT. At time periods of 91 and 98 days, the samples containing 0.10% and 0.50% tocopherols actually showed less oxidation than the sample containing BHT.

TABLE 3

| | Performance Of Tocopherol Mixture In Gum Base | | | | | | | | | | | | | | |
| --- | --- | --- | --- | --- | --- | --- | --- | --- | --- | --- | --- | --- | --- | --- | --- |
| | Peroxide Value (meq/kg) (100° F., 100 psi oxygen) | | | | | | | | | | | | | | |
| Antioxidant Type And Level (% based on weight of gum base) | 0 Days | 7 Days | 14 Days | 21 Days | 28 Days | 35 Days | 42 Days | 49 Days | 56 Days | 63 Days | 70 Days | 77 Days | 84 Days | 91 Days | 98 Days |
| 0 | 0 | 2.0 | 4.0 | 10.0 | 36.6 | 94.0 | 105 | 111 | 109 | 94 | 78 | 60 | 47 | 35 | 28 |
| .05% Tenox GT-2 | 0 | 2.0 | 2.0 | 6.0 | 7.9 | 9.9 | 11.8 | 13.9 | 18 | 18 | 22 | 25 | 56 | 117 | 126 |

TABLE 3-continued

Performance Of Tocopherol Mixture In Gum Base
Peroxide Value (meq/kg) (100° F., 100 psi oxygen)

| Antioxidant Type And Level (% based on weight of gum base) | 0 Days | 7 Days | 14 Days | 21 Days | 28 Days | 35 Days | 42 Days | 49 Days | 56 Days | 63 Days | 70 Days | 77 Days | 84 Days | 91 Days | 98 Days |
|---|---|---|---|---|---|---|---|---|---|---|---|---|---|---|---|
| .10% Tenox GT-2 | 6.0 | 4.0 | 6.0 | 8.0 | 9.9 | 10.9 | 11.9 | 13.9 | 18 | 18 | 19 | 21 | 20 | 22 | 34 |
| .50% Tenox GT-2 | 2.0 | 4.0 | 8.0 | 10.0 | 11.8 | 12.9 | 15.7 | 17.7 | 18 | 18 | 20 | 20 | 21 | 21 | 22 |
| .04% BHT | 0 | 0 | 0 | 0 | 0 | 2.0 | 2.0 | 4.0 | 4.0 | 6.0 | 10 | 10 | 15 | 61 | 89 |

While the embodiments of the invention disclosed herein are at present considered to be preferred, various modifications and improvements can be made without departing from the spirit and scope of the invention. The scope of the invention is indicated in the appended claims, and all changes that come within the meaning and range of equivalency of the claims are intended to be embraced therein.

We claim:

1. A stabilized chewing gum base which comprises a polyisobutylene elastomer, a filler, a softener, and an antioxidant which consists essentially of 7-20% by weight alpha tocopherol, 45-75% by weight gamma tocopherol, 18-32% by weight delta tocopherol and 0-3% by weight beta tocopherol.

2. The stabilized chewing gum base of claim 1 wherein the antioxidant has been preblended with the polyisobutylene.

3. The stabilized chewing gum base of claim 1 in a chewing gum.

4. A stabilized chewing gum base which comprises a styrene butadiene copolymer elastomer, a filler, a softener, and an antioxidant which consists essentially of 7-20% by weight alpha tocopherol, 45-75% by weight gamma tocopherol, 18-32% by weight delta tocopherol and 0-3% by weight beta tocopherol.

5. The stabilized chewing gum base of claim 4 wherein the antioxidant has been preblended with the styrene butadiene copolymer.

6. The stabilized chewing gum base of claim 4 in a chewing gum.

7. A stabilized chewing gum base which comprises an isobutylene-isoprene copolymer elastomer, a filler, a softener, and an antioxidant which consists essentially of 7-20% by weight alpha tocopherol, 45-75% by weight gamma tocopherol, 18-32% by weight delta tocopherol and 0-3% by weight beta tocopherol.

8. The stabilized chewing gum base of claim 7 wherein the antioxidant has been preblended with the isobutylene-isoprene copolymer.

9. The stabilized chewing gum base of claim 7 in a chewing gum.

10. A stabilized chewing gum base which comprises a polyvinyl acetate elastomer, a filler, a softener, and an antioxidant which consists essentially of 7-20% by weight alpha tocopherol, 45-75% by weight gamma tocopherol, 18-32% by weight delta tocopherol and 0-3% by weight beta tocopherol.

11. The stabilized chewing gum base of claim 10 wherein the antioxidant has been preblended with the polyvinyl acetate.

12. The stabilized chewing gum base of claim 10 in a chewing gum.

13. A stabilized chewing gum base which comprises a vinyl acetate vinyl laurate copolymer elastomer, a filler, a softener, and an antioxidant which consists essentially of 7-20% by weight alpha tocopherol, 45-75% by weight gamma tocopherol and 18-32% by weight delta tocopherol and 0-3% by weight beta tocopherol.

14. The stabilized chewing gum base of claim 13 wherein the antioxidant has been preblended with the vinyl acetate-vinyl laurate copolymer.

15. The stabilized chewing gum base of claim 13 in a chewing gum.

16. A stabilized chewing gum base which comprises a natural rubber elastomer, a filler, a softener, and an antioxidant which consists essentially of 7-20% by weight alpha tocopherol, 45-75% by weight gamma tocopherol, 18-32% by weight delta tocopherol and 0-3% by weight beta tocopherol.

17. The stabilized chewing gum base of claim 16 wherein the antioxidant has been preblended with the natural rubber.

18. The stabilized chewing gum base of claim 16 in a chewing gum.

19. A stabilized chewing gum base which comprises a natural gum elastomer, a filler, a softener, and an antioxidant which consists essentially of 7-20% by weight alpha tocopherol, 45-75% by weight gamma tocopherol, 18-32% by weight delta tocopherol and 0-3% by weight beta tocopherol.

20. The stabilized chewing gum base of claim 19 wherein the antioxidant has been preblended with the natural gum.

21. The stabilized chewing gum base of claim 19 in a chewing gum.

22. A chewing gum composition, comprising a water soluble bulk portion, a water insoluble chewing gum base portion and a flavoring agent, the chewing gum base portion comprising an elastomer and an antioxidant which consists primarily of 7-20% by weight alpha tocopherol, 45-75% by weight gamma tocopherol, 8-32% by weight delta tocopherol and 0-3% by weight beta tocopherol.

23. The chewing gum composition of claim 22 wherein the elastomer comprises a styrene butadiene copolymer.

24. The chewing gum composition of claim 22 wherein the elastomer comprises polyisobutylene.

25. The chewing gum composition of claim 22 wherein the elastomer comprises an isobutylene-isoprene copolymer.

26. The chewing gum composition of claim 22 wherein the elastomer comprises polyvinyl acetate.

27. The chewing gum composition of claim 22 wherein the elastomer comprises a natural rubber selected from the group consisting of latex rubber, guayule, and mixtures thereof.

28. The chewing gum composition of claim 22 wherein the elastomer comprises a natural gum selected from the group consisting of jelutong, lechi caspi, perillo, massaranduba balata, massaranduba chocolate, nispero, rosindinha, chicle, gutta hang kang, and mixtures thereof.

* * * * *

UNITED STATES PATENT AND TRADEMARK OFFICE
CERTIFICATE OF CORRECTION

PATENT NO. : 5,132,121

DATED : July 21, 1992

INVENTOR(S) : Charles P. Orfan et al.

It is certified that error appears in the above-identified patent and that said Letters Patent is hereby corrected as shown below:

On the title page, In the Abstract:

line 1 of the Abstract, please delete "stablized" and substitute therefor --stabilized--.

In column 5, line 45, please delete "mono.," and substitute therefor -- mono- --.

In column 5, line 53, please delete "mono.," and substitute therefor -- mono- --.

Column 9:

In claim 13, line 2, please delete "acetate vinyl" and substitute therefor --acetate-vinyl--.

UNITED STATES PATENT AND TRADEMARK OFFICE
CERTIFICATE OF CORRECTION

PATENT NO. : 5,132,121

DATED : July 21, 1992

INVENTOR(S) : Charles P. Orfan et al.

It is certified that error appears in the above-identified patent and that said Letters Patent is hereby corrected as shown below:

Column 10:
In claim 22, line 7, please delete "8-32%" and substitute therefor --18-32%--.

Signed and Sealed this

Twenty-first Day of September, 1993

Attest:

BRUCE LEHMAN

*Attesting Officer*   *Commissioner of Patents and Trademarks*